United States Patent [19]
Hamdi et al.

[11] Patent Number: 5,724,099
[45] Date of Patent: Mar. 3, 1998

[54] PROCESS FOR CONTROLLING THE OUTFLOW RATE OF A CODER OF DIGITAL DATA REPRESENTATIVE OF SEQUENCES OF IMAGES

[75] Inventors: Maher Hamdi, Reuues; Rolin Pierre, Cerrou Sevigue; James Roberts, Vrgisins le Bretonneux, all of France

[73] Assignee: France Telecom, Paris, France

[21] Appl. No.: 658,050

[22] Filed: Jun. 4, 1996

[30]  Foreign Application Priority Data

Jul. 10, 1995 [FR] France ................. 95 08581

[51] Int. Cl.$^6$ .......................... H04N 7/12; H04N 11/02; H04N 11/04; H04N 7/00
[52] U.S. Cl. ............. 348/419; 348/405; 348/466
[58] Field of Search ................. 348/405, 419, 348/466; H04N 7/12, 11/02, 11/04, 7/00, 11/00

[56]  References Cited

U.S. PATENT DOCUMENTS

| | | | |
|---|---|---|---|
| 5,159,447 | 10/1992 | Haskell et al. | 348/419 |
| 5,231,484 | 7/1993 | Gonzalea et al. | 348/405 |
| 5,331,348 | 7/1994 | Knauer et al. | 348/419 |
| 5,426,463 | 6/1995 | Reininger et al. | 349/419 |
| 5,543,853 | 8/1996 | Haskell et al. | 348/419 |

OTHER PUBLICATIONS

IEEE Transactions on circuits and system for video technology, Dec. 1992.
Proceedings. IEEE Infocom '95. Pancha P. et al, "Leaky bucket access control for VBR MPEG video", pp. 796 to 803.
IEEE/ACM Transactions on Networking, Jun. 1995, vol. 3, No. 3 pp. 329–339.
IEEE/ACM Transactions on Networking, Apr. 1994, vol. 2, No. 2 pp. 176–180.
IEEE Transactions on Circuits and Systems for Video Technology, Dec. 1992, vol. 2, No. 4, pp. 361–372.

Primary Examiner—Tommy P. Chin
Assistant Examiner—Nhon T. Diep
Attorney, Agent, or Firm—Laff, Whitesel, Conte & Saret Ltd.

[57] ABSTRACT

A process for controlling the output flow rate of a coder of digital data representative of sequences of images, the coding effected by the coder including a quantization stage of quantization parameter Q, the sequences of images being made up of successive groups of images. The process consists of determining, at the moment of the presence of the i group of images at the output of the coder, the quantization parameter $Q(i+1)$ for the coding of the $(i+1)$ group of images so that the flow rate at the output of the coder conforms with a version of a leaky bucket defined by a size M and by a leakage rate $\lambda$ in terms of the activity of the scene represented by the i group of images.

9 Claims, 3 Drawing Sheets

PROCESS FOR CONTROLLING THE OUTFLOW RATE OF A CODER OF DIGITAL DATA REPRESENTATIVE OF SEQUENCES OF IMAGES

BACKGROUND OF THE INVENTION

The present invention relates to a process for controlling the output flow rate of a coder of digital data representative of sequences of images. The field of the invention is that of multimedia applications, and in particular the applications of transmission on high-rate networks of the ATM type of animated images, compressed, for example according to an algorithm defined in the standard known as Mpeg-2, stored or in real time.

Video compression is based on handling the redundancy of information which characterizes the animated images. Two forms of redundancy of information are present: spatial and temporal. Spatial redundancy is that existing within the same image and is the fact that the adjacent pixels of the image have a tendency to have very close values of luminance and/or chrominance. As for temporal redundancy, it exists between successive images and is the fact that the pixels having the same position in two adjacent images have a tendency to have very close values of luminance and/or chrominance.

In the course of the description, we will call spatial activity or spatial complexity a magnitude which is directly linked with the spatial correlation. When the spatial complexity is great, the correlation is small and vice versa. As a matter of fact video compression consists of using coding techniques which handle redundancies to produce a quantity of data which is less than that of the basic video signal.

A lot of research work has resulted in algorithms for compression of the image whose properties are significantly different. Nevertheless in all cases, a compressed image is arranged in a structured block having a size which is more or less important and can vary from one image to the other.

Reduction of the spatial redundancy is essentially effected at the quantization stage. After having effected a discrete transformation into cosines on each block of an image, the coefficients obtained are divided by integer values given by the quantization matrix. This integral division has the object of increasing the number of zero values which will not be represented after a Huffman coding. Because of this integral division, this operation introduces an error into the restored values. In order to effect a more or less great compression, the quantization matrix is weighted by a coefficient known as a quantization parameter (generally written Q). The greater the value of this parameter, the more important the reduction gain and vice versa. Thus, the impact of the quantization parameter on the visual degradation of the restored image depends on the spatial complexity of the image. In other words, in order to have an equivalent visual quality, the quantization parameter used when compressing an image containing a large number of small details is smaller than that used for the compression of a rather uniform image.

In the same way, in order to have a constant flow rate, the quantization parameter used when compressing an image containing a large number of small details is larger than that used for the compression of a rather uniform image.

Finally, the compression of an image having strong spatial complexity or great spatial activity produces, for a quantization parameter Q of constant value, more data than the compression of an image having little spatial complexity.

The technique used for the reduction of the temporal redundancy is the estimation and compensation of movement. It is a question of determining the position of each block or macroblock of one image in the following image. The size of the search window in the following image is limited by the fact of the complexity of calculation. If the macroblock searched for is found in the search window, a movement vector is defined which describes the movement of the macroblock. This is estimation of movement.

Generally, the macroblock found is not exactly identical with the original macroblock, but differs, as regards several pixels, by an error. A correction of this error is then effected by coding the difference pixel by pixel between the two macroblocks. This is compensation of movement.

If the macroblock is not found in the search window, it is then coded by transformation and quantization as has already been described above.

Thus, if the temporal complexity is great, i.e. if the movement of the macroblocks from one image to the other is considerable, for example at the time of scene changes, rapid zooms of the camera etc., the estimation of the movement vectors fails and a large quantity of data is generated for the coding of the scene.

A scene is a succession of images having more or less the same content within a video seqence. It involves for example a person speaking in front of a stationary background or a stationary shot.

In the course of the description, a scene which shows a great spatial and temporal complexity and which therefore requires for its transmission a greater flow rate than the average flow rate for transmitting the entire video sequence, will be called an active scene. On the other hand, a scene which has a low spatial and temporal complexity, i.e. for which the necessary flow rate for transmission is less than the average flow rate for transmission of the entire video sequence will be called an inactive scene.

Here, the flow rate is the quantity of data transmitted per unit of time.

In order to be able to transmit their information on network services with constant flow rate, the compression algorithms generally integrate mechanisms for keeping the flow rate almost constant at the output of the coder.

The networks which use the asynchronous switching technique ATM were designed to be able to transmit traffic of different types with different qualities of service. They are based on the transmission of small-size cells of 48 octets of data and 5 octets of heading. In principle, such networks permit connections with variable flow rate in time.

For the transmission of compressed image data, the fact of allowing variation of the flow rate at the output of the coder permits better adaptation to the complexity of the image, which is of a variable nature, and therefore gives rise to a better visual quality than codings with constant flow rate.

The field of application of the invention is therefore that of coding image data with variable flow rate.

Quality of service refers to the aptitude of a network to respect the constraints, in terms of losses of data and of transfer delay, of these applications for transmission of images. For example, access to the wide band network is based on the principle of a traffic contract and of the guarantee of quality of service. The design of the network therefore requires management and resource allocation mechanisms adapted to each type of traffic, which proceeds by the definition of traffic descriptors which allow the network to arrange for the resources necessary to guarantee the required quality of service. During the connection, the network carries out a continuous monitoring of the traffic transmitted by the video coder so as to verify its conformity with the descriptors announced by the traffic contract. When the user exceeds his traffic contract, the excess cells may be rejected.

Apart from the peak rate, two parameters are proposed nowadays as part of the descriptor of the traffic with variable flow rate: the maintained flow rate or Sustainable Cell Rate (SCR) and the jitter tolerance or Burst Tolerance (BT). A precise and standard mechanism, the algorithm known as GCRA based on the mechanism known as the leaky bucket allows these parameters to be controlled. Conformity with these parameters is equivalent to conformity with the corresponding leaky bucket. The two parameters SCR and BT correspond with the two parameters of the leaky bucket. It is therefore important that there is a control mechanism in the coder for monitoring and possibly limiting the flow rate at the output of the coder in order to stay in compliance with the traffic contract without there being any loss of information.

If the network used for the transport of the compressed flux offers connections with constant flow rate, a flow rate controlling algorithm must be used to ensure that the output flow rate of the coder remains constant. This technique consists of varying the quantization parameter Q, from one image to the other and within the same image to satisfy the constraint of constant flow rate. The principle used in this type of algorithm is to maintain, between the coder and the network channel, a buffer in which the compressed data are stored. This buffer is continually emptied at the flow rate of the network channel. The flow rate controlling algorithm should prevent the buffer from overflowing or becoming empty. The quantization parameter Q evolves proportionately to the rate of filling of the buffer. The disadvantage of this coding is that it compels all scenes to generate the same flow rate and therefore to have different visual qualities.

One example of the description of a control algorithm which allows the flow rate to be made equal to a flow rate specified a priori at the output of the coder is given by the standard Mpeg.

If the quantization parameter is constant for the duration of the entire video sequence, it is the flow rate at the output of the coder which varies. The coder is said to be functioning in open loop.

SUMMARY OF THE INVENTION

The objective of the invention is to propose a process for controlling the output flow rate of a video coder which conforms with the version of the leaky bucket.

Such a process is already known and reference is made to the article by A. R. Reibman and B. G. Haskell entitled "Constraints on Variable bit rate video for ATM networks" which appeared in the journal IEEE Transactions on Circuits and Systems for Video Technology, 254): 361–372 in December 1992. In this article, Reibman and Haskell show a system which includes a video coder provided with a buffer and a device designed to control the flow rate transmitted to the network. To do this, they use the version of the leaky bucket and vary the quantization parameter Q in terms of the rates of filling of the buffer and of the bucket. More precisely, a leaky bucket is considered whose size is M and whose rate of leakage is equal to the average desired flow rate of the traffic. If $X(t)$ is the filling of the bucket at the instant t, $B^d_{max}$ the maximum size of the buffer of the decoder and $B^d(t)$ its size at the instant t and if, at the instant t, one wishes to code an image which is going to be decoded at the instant t+T, a quantization parameter Q is used which is proportional to the filling of the bucket and of the buffer of the decoder. The result of this is that the flow rate is inversely proportional to the quantization parameter, so that the more the bucket and the buffer fill up the lower the flow rate generated. This allows one to stay within the maximum values permitted as regards the flow rate transmitted to the network. The quantization parameter Q is given by the following relationship:

$$Q=2*INT(32*max[X(t)/M,[(B^d_{max}-B^d(t+T))/B^d_{max}]])+2$$

where INT signifies "entire part of".

Proceeding from this first expression, Reibman proposes to reduce the quantization parameter Q by a prefixed value $Q_{min}$ to prevent too low values of the quantization parameter Q from generating too important flow rates which would needlessly fill up the bucket:

$$Q=max[Q_{min},2*INT(32*max[X(t)/M,[(B^d_{max}-B^d(t+T))/B^d_{max}]])+2]$$

The disadvantage of this algorithm is that the choice of quantization parameter Q only depends on the filling-up of the bucket and does not take into consideration the complexity of the scene in progress. Indeed, if the bucket is empty, the algorithm increases the flow rate of the image even if this is very inactive and can be satisfied with a transmission flow rate lower than a flow rate of average value. Therefore the bucket is going to fill up by reason of the high flow rate generated but this will not give rise to an improvement in the quality of the scene if this is inactive. Owing to the fact that the bucket is full, the following scene is going to be constrained to generate an average flow rate or a lower flow rate which, if this scene is an active scene, is going to result in a visible degradation of the image.

Also, the algorithm described by Reibman and Haskell allows control of the buffer of the coder and of the bucket of the control process but does not satisfactorily manage distribution of the flow rate in terms of the complexity of the scene.

The object of the invention is to remedy this disadvantage and is therefore to propose a process for controlling the flow rate which takes into account the complexity of the scene whilst maintaining the no-overflow condition of the bucket.

In order to achieve this objective, the invention proposes a process for controlling the output flow rate of a coder of digital data representative of image sequences, the coding effected by said coder including a quantization stage of quantization parameter Q, said image sequences being made up of successive groups of images. Said process consists of determining, at the moment of the presence of the i group of images at the output of the coder, the quantization parameter Q(i+1) for coding the (i+1) group of images so that the flow rate at the output of said coder conforms with a version of leaky bucket defined by a size M and by a rate of leakage λ.

It is characterized in that it consists of determining said quantization parameter Q(i+1) for the coding of the (i+1) group of images in terms of the activity of the scene represented by the i group of images, the scene of said i group of images being called active when its flow rate in open loop is greater than the rate λ of the leaky bucket and being called inactive when it is lower than this, said flow rate in open loop of a group of images being the flow rate which said block of images would have at the output of said coder if it had been quantized with a constant quantization parameter Qo chosen so that the average flow rate D over the whole sequence of images to which said block of images belongs is equal to the leakage rate of said leaky bucket.

Advantageously, it consists of determining the quantization parameter Q(i+1) so that the flow rate at the output of the coder is equal, in the case of active scenes, either to the flow rate in open loop when the rate of filling of the bucket is zero, or to the leakage rate of said leaky bucket when the rate of filling of the bucket is equal to the maximum rate of filling of said bucket, or to a value included between the flow rate in open loop and the leakage rate when the rate of filling of said bucket takes a non-zero value lower than its maximum rate of filling, and, in the case of inactive scenes, either to the leakage rate of said leaky bucket when the rate of filling of the bucket is zero, or to the flow rate in open loop when the rate of filling of the bucket is equal to the maximum rate of filling of said bucket, or to a value included between the leakage rate and the flow rate in open loop when the rate of filling of said bucket takes a non-zero value lower than its maximum rate of filling.

Advantageously, it consists of determining the quantization parameter by calculation, in the case of active scenes, of a function having as variable the rate of filling of the leaky bucket and as parameter, the leakage rate of said bucket, the maximum rate of filling of said bucket and a predetermined quantization parameter and, in the case of inactive scenes, of another function having the same variables and the same parameters.

It consists of determining the quantization parameter so that the flow rate at the output of the coder is equal, in the case of active scenes, to the result of the calculation of a continuous decreasing function f having as variable the rate of filling of the leaky bucket which takes a value equal to the flow rate in open loop as a zero value of the rate of filling of the bucket, a value equal to the leakage rate of said leaky bucket as a value of the rate of filling of the bucket equal to the maximum rate of filling of said bucket, and a value included between the flow rate in open loop and the leakage rate as intermediate values of the rate of filling and, in the case of inactive scenes, to the result of the calculation of a continuous decreasing function g having as variable the rate of filling of the leaky bucket which takes a value equal either to the leakage rate of said leaky bucket as a zero value of the rate of filling, a value equal to the flow rate in open loop as a value of the rate of filling of the bucket equal to the maximum rate of filling of said bucket, and values included between the leakage rate and the flow rate in open loop as intermediate values of the rate of filling.

BRIEF DESCRIPTION OF THE DRAWINGS

The above-mentioned characteristics of the invention, as well as others, will become clearer on reading the following description of an embodiment, said description being given with reference to the attached drawings, which are as follows.

DESCRIPTION OF THE PREFERRED EMBODIMENTS

Prior to the actual description of the invention, we are going to define the notions of traffic and of conformity with a version of leaky bucket.

The output traffic of a coder is defined on the basis of the groups of images which this delivers to its output. This traffic written $\{G\}$ is defined by a sequence of numbers $G(i)$ which measure the number of bits generated by the compression of the i group of images of a video sequence. The period of each group of images is written $\tau$. The average flow rate D over a video sequence of size equal to n groups of images is defined by the following relationship:

$$D = \frac{1}{n\tau} \sum_{i=0}^{n-1} G(i)$$

The version of leaky bucket can be defined in several ways all expressing the same thing. Two parameters serve to define a leaky bucket: the size of the bucket written M (in bits) and the leakage rate written $\lambda$ (in bits per second). A traffic $\{G\}$ conforms with a version of leaky bucket of parameters M and $\lambda$ if it verifies the following relationship:

$$\forall (n < m) \sum_{i=n}^{m-1} G(i) \leq \lambda\tau(m-n) + M$$

Figure 1:
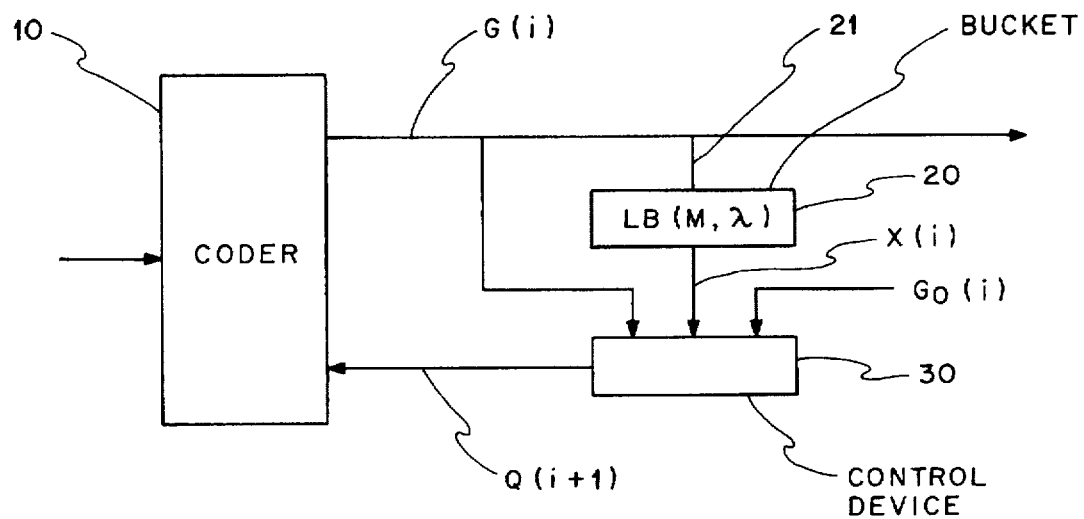
FIG. 1 is a block diagram of a process according to the invention.

This being specified, consideration will now be given to FIG. 1 which is a schematic representation of the process according to the invention. FIG. 1 shows a coder 10 which ensures the coding of video sequences which are present at its input and which outputs, for each video sequence, a succession of blocks of images each tagged with an index varying from 1 to n, n being the number of groups of images in said sequence. The i block of images of a sequence therefore has the index i. The coding is effected by quantization of each block of images with a quantization parameter written $Q(i)$ and generates a bit rate for this block of images written $G(i)$.

Still in FIG. 1, a schematic representation 20 of the leaky bucket is shown. It receives at its input 21 each group of images i having a flow rate $G(i)$. The leaky bucket 20 is defined by two parameters: its size written M (in bits) and the leakage rate written $\lambda$ (in bits per second). In terms of the value of the flow rate $G(i)$ present at its input, the parameter of size M and the leakage rate parameter $\lambda$, the leaky bucket 20 calculates an item of information written $X(i)$ corresponding to the number of bits in the bucket 20 at the moment of the i block of images.

In FIG. 1, there is also a control device 30 which implements the process of the invention. It receives at its inputs, at the moment of processing the i block of images, the information $X(i)$ concerning the number of bits present in the bucket 20 and the value of the bit rate $G(i)$ at the output of the coder 10. The device 30 outputs, to the coder 10, the value of the quantization parameter $Q(i+1)$ which this latter will apply to the (i+1) block of images of the video sequence during processing.

As will become clear during the course of the description, the process of the invention also needs the value taken by the flow rate $Go(i)$ which is the flow rate which the i block of images would have if it had been quantized in the coder 10 with a predetermined constant quantization parameter Qo. The parameter Qo should be chosen so that the average flow rate D over the whole video sequence in which each group of images is quantized with this constant parameter Qo is equal to the leakage rate λ of the bucket 20. We have D which therefore verifies the following relationship:

$$D = \frac{1}{n\tau} \sum_{i=0}^{n-1} G(i)$$

The coder 10 is therefore said to function in open loop. Each flow rate value Go(i) is either given out by the coder 10, or, as will be shown in a particular embodiment of the invention, calculated by the device 30.

The object of the invention is to maintain a quality which is the closest possible to that offered by a coding in open loop. Now the traffic generated by a coding in open loop does not guarantee conformity with a version of leaky bucket LB(M, λ) since it is not restricted as to flow rate.

In a general way, an active scene has a tendency to fill the bucket since, by definition, it generates a flow rate greater than the average flow rate D which, in open loop, is equal to the leakage rate λ of the bucket. On the other hand, a scene of low activity tends to empty the bucket since it generates a rate lesser than λ. If an active scene is excessively long, the bucket with M capacity overflows.

In order to resolve this problem, the invention proposes to work on the quantization parameter Q to satisfy this constraint regarding the flow rate. The gain factor of the feedback mouth is however much lower than that of the algorithms in which the flow rate at the output of the coder is kept constant.

We are now going to consider the two extreme cases which are, on the one hand, the bucket is full (X(i)=M) and, on the other hand, the bucket is empty (X(i)=0).

In the first case, when the scene is active, that is to say when Go(i)>λ, the quantization factor Q(i+1) is chosen so that the flow rate G(i+1) is equal to the leakage rate λ of the bucket. When the scene is inactive, that is to say when Go(i)<λ, the quantization factor chosen Q(i+1) is that of open loop, that is to say Qo. The flow rate G(i) is therefore equal to the open-loop flow rate Go(i).

Thus, when the bucket is full, the active scenes do not exceed the rate λ and the bucket does not overflow. As for the inactive scenes, they are coded in open loop and their low flow rate permits the bucket to be emptied. The visual quality is therefore at least as good as with the process of coding with constant flow rate for the active scenes and as good as with the process of coding in open loop for the inactive scenes.

In the second case (X(i)=0), when the scene is active, that is to say when Go(i)>λ, the quantization factor Q(i+1)=Qo is chosen, allowing a flow rate G(i+1) to be obtained which is equal to the open-loop flow rate, i.e. Go(i). On the other hand, when the scene is inactive, that is to say when Go(i)<λ, the quantization factor Q(i+1) which is chosen allows a flow rate G(i) to be obtained which is equal to the leakage rate of the bucket, that is to say λ.

Thus, if the bucket is not very full, the quality of the group of images i for an inactive scene is at least as good as that obtained by an open-loop coding which, itself, would have generated a flow rate lower than λ. An active scene is on the other hand permitted to generate a flow rate greater than λ and therefore to fill the bucket.

The table below sums up these four conditions. The quantization parameter is marked Q (i+1) which allows a flow rate G(i) to be obtained for the i block of images equal to λ.

|  | $G_o(i) \leq \lambda$ | $G_o(i) \geq \lambda$ |
|---|---|---|
| X(i) = M | Q(i) = Q$_o$ | Q(i) = Q$_\lambda$(i) |
| X(i) = 0 | Q(i) = Q$_\lambda$(i) | Q(i) = Q$_o$ |

For intermediate bucket filling values, the chosen values of the quantization parameter Q(i+1) allow flow rates G(i) to be obtained which are respectively in the case of active scenes or in that of inactive scenes included between Go(i) and λ or between λ and Go(i). The following relationships can be written:

in the case of active scenes:

$$G(i)=f(Go(i), \lambda, X(i))$$

with $$f(Go(i), \lambda, 0)=Go(i) \text{ and } f(Go(i), \lambda, M)=\lambda$$

and, in the case of inactive scenes:

$$G(i)=g(Go(i), \lambda, X(i))$$

with $$g(Go(i), \lambda, 0)=\lambda \text{ and } g(Go(i), \lambda, M)=Go(i)$$

According to the theory for processing images such as is described by T. Berger in a work entitled "Rate Distortion Theory, a Mathematical Basis for Data Compression", Englewood Cliffs, N.J.: Prentivce Hall, of 1971, it is today acknowledged that the function of flow rate and the function of distortion of the image vary in the opposite direction from one another and that the flow rate-distortion relationship of a video sequence depends on the activity of the scene. The quantization parameter Q is directly responsible for the distortion of the image. Indeed, the higher its value, the more the image is distorted and vice versa. It is therefore deduced from this that the value taken by the quantization parameter Q and the flow rate G which results from this quantization vary in inverse direction from one another.

The relationship which links Q and G is not simple to determine and has been the object of a great deal of research. However it will be noted that all this research is concerned with an exact and precise relationship which is valid on the scale of the macroblock since it is necessary for the algorithms of coding with constant flow rate.

Now in the present invention, we are interested in a different type of control which does not act at the level of the macroblock but at the level of the group of images. Therefore the relationship which links the quantization parameter Q and the flow rate G which, if one is interested in a group of images, are averaged over the group of images, can be approximated more easily since the fine variations within an image are no longer taken into account.

An empirical function has been established between the quantization parameter Q and the flow rate G. In order to do this, a video sequence containing 500 images was compressed to the CIF format by using the algorithm Mpeg-1. Five open-loop compressions were effected (the value of the quantization parameter is constant and equal to Qo) for five different values of the quantization parameter Qo and five others for flow rate values Go giving five values of constant average flow rate D.

The table below shows the flow rate averages for the coding in open loop and the averages of the quantization parameters for the coding with constant average flow rate.

| Open loop | | Constant average flow rate | | |
|---|---|---|---|---|
| Q | $\bar{G_0(i)}$,n b/s | $\lambda$ ,n b/s | $\bar{Q_\lambda(t)}$ | $\lambda Q \times 10^{-6}$ |
| 25 | 854630 | 854630 | 25.62 | 21.36 |
| 30 | 713382 | 713382 | 30.44 | 21.40 |
| 35 | 625557 | 625557 | 34.79 | 21.89 |
| 40 | 557260 | 557260 | 39.80 | 22.29 |
| 45 | 505107 | 505107 | 44.86 | 22.72 |

It can be seen that the product of the value of the quantization parameter Q and of the average rate D is almost constant at 23±3% and is independent of the nature of the coding (open-loop or constant average flow rate) as well as of the value taken by the quantization parameter Q.

Figure 2:
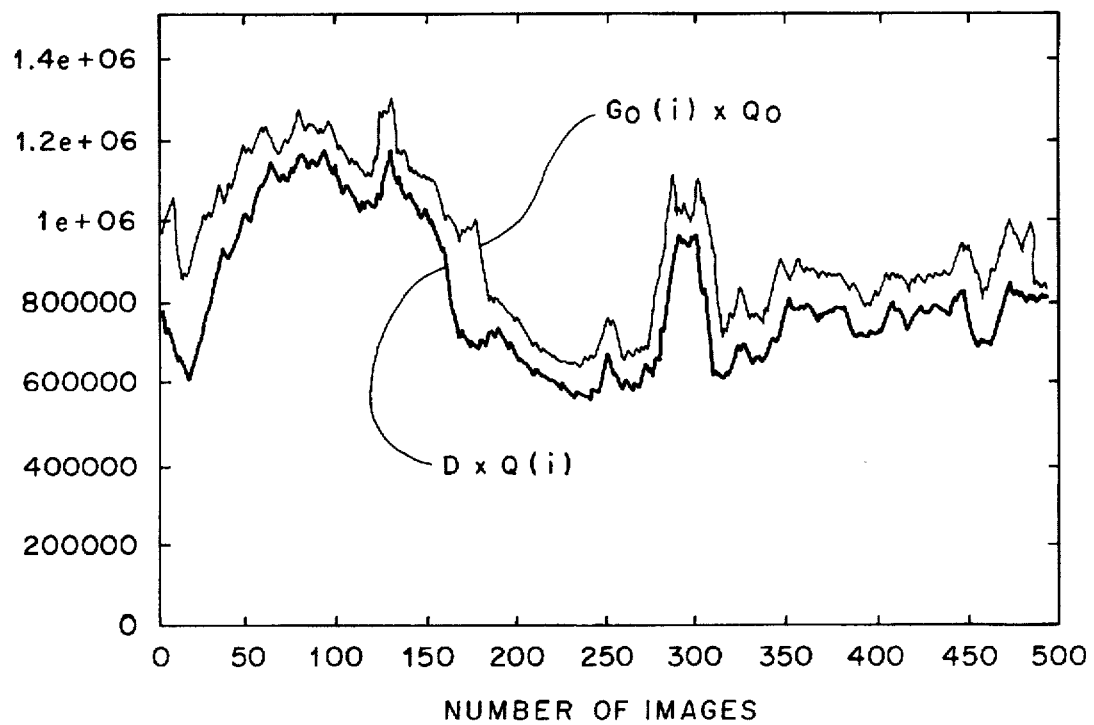
FIG. 2 is a graph showing two curves in which one can see the constant of the product G×Q, where G is the flow rate as defined below.

FIG. 2 shows the values taken by the products $D \times Q\lambda(i)$ and $Go(i) \times Qo$ in terms of the image numbers. Furthermore it can be seen that these two products are equal for every group of images and that it therefore only depends on the image to be processed and its variations indicate the activity of the scene.

From the above statements, the following relationship can be written:

$$G_o(i) \times Q_o = \lambda Q_\lambda(t) = G(i) \times Q(i) \qquad \forall i.$$

From this relationship, a recursive relationship giving the value of Q(i+1) can be written:

$$Q(i+1) = Qo \times Go(i)/G(i)$$

Bearing in mind the above relationships, one can write, in the case of active scenes:

$$Q(i+1) = Qo \times Go(i)/f(Go(i), \lambda, X(i))$$

and, in the case of inactive scenes:

$$Q(i+1) = Qo \times Go(i)/g(Go(i), \lambda, X(i))$$

It will be noted that the functions f(Go(i), λ, X(i)) and g(Go(i), λ, X(i)) can be expressed solely in terms of the parameters M, λ, and Go(i), or Qo.

Thus it can be seen that the parameters of the relationships are therefore λ, M and Qo. The first two parameters are those of the leaky bucket and are therefore fixed according to considerations linked with the network contract and/or with the desired quality of image. As for the parameter Qo, it should be chosen so that the average flow rate D of the traffic generated by an open-loop coding of parameter Qo is precisely equal to λ.

The flow rate G(i) provided for a given group of images depends on the state of filling of the bucket X(i) as well as the activity of the scene. The performance of the process of the invention in terms of visual quality as well as of stability depend on the way in which the rate G(i) varies with the state of filling of the bucket X(i).

Figure 3:
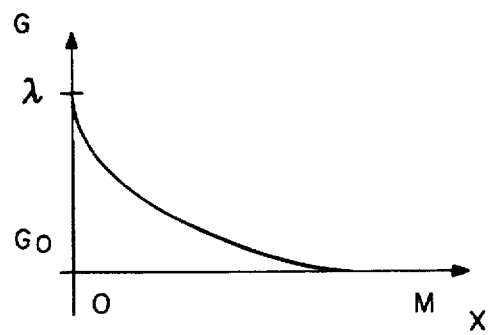
FIG. 3 shows two curves representing the variation in the flow rate at the output of the coder in terms of the rate of filling of the leaky bucket, and this, for active and inactive scenes.
Figure 3:

A formulation of G(i) in terms of X(i) which is particularly advantageous has been looked for. FIG. 3 represents curves of the variations of G(i) in terms of X(i) in the case of active scenes and in the case of inactive scenes. The shape of these curves is chosen to stimulate the filling of the bucket during the active scenes and to encourage the inactive scenes to empty it. Indeed, for a scene having little activity identified by Go(i)<λ a half-full bucket is considered as still being almost full. The flow rate generated by the groups of images of this scene is therefore going to be close to Go(i) which allows the bucket to empty more quickly. Conversely, for a very active scene identified by Go(i)>λ, a half-full bucket is seen as being almost empty. The flow rate generated is therefore not restricted which allows the visual quality of this scene to be maintained for as long a time as possible within the limits of the size of the bucket. The allocation of G(i) can therefore be written as follows:

$$G_o(i) \geq \lambda \rightarrow (G(i) = G_o(i) \cdot (1 - \epsilon_1(x)) + \lambda \cdot \epsilon_1(x))$$

$$G_o(i) \leq \lambda \rightarrow (G(i) = \lambda \cdot (1 - \epsilon_2(x)) + G_o(i) \cdot \epsilon_2(x))$$

with $$x = \frac{X(i)}{M}$$

designates the standard filling of the bucket.

Figure 4:
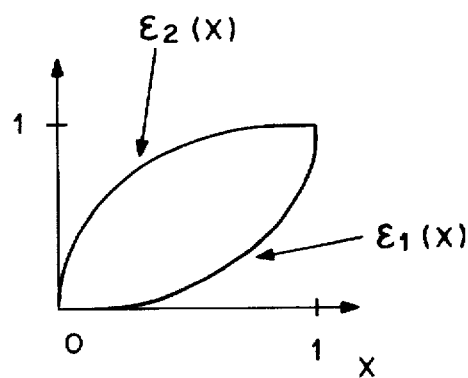
FIG. 4 is a graph representing the functions used by the process of the invention.

FIG. 4 shows the form of the functions $\epsilon_k(x)$.
The explicit functions chosen are:

$$\epsilon_1(x) = x^\alpha \text{ and } \epsilon_2(x) = 1 - (1-x)^\alpha.$$

If one transfers these equations into those which give Q(i+1), one obtains:

$$Q(i+1) = \frac{Q_o G_o(i)}{(1 - \epsilon_1(x)) G_o(i) + \epsilon_1(x)\lambda} \text{ if } G_o(i) > \lambda$$

and $$Q(i+1) = \frac{Q G_o(i)}{\epsilon_2(x) G_o(i) + (1 - \epsilon_2(x))\lambda} \text{ if } G_o(i) \leq \lambda$$

where $$G_o(i) = \frac{G(i) Q(i)}{Q_0} \text{ and } = \frac{X(i)}{M}$$

The above algorithm has been entered and tested on the coding software Mpeg distributed by the university of Berkley.

A sequence of 2000 images has been coded, on the one hand, in open loop by using a constant quantization parameter Qo equal to 35 and, on the other hand, by using the algorithm of the invention with the parameters λ=0.78 Mbits/s, M=564710 bits which is equivalent to an average size for the storage of 18 images and a quantization parameter Qo=35. The size of each group of images was 12 images.

Figure 5:
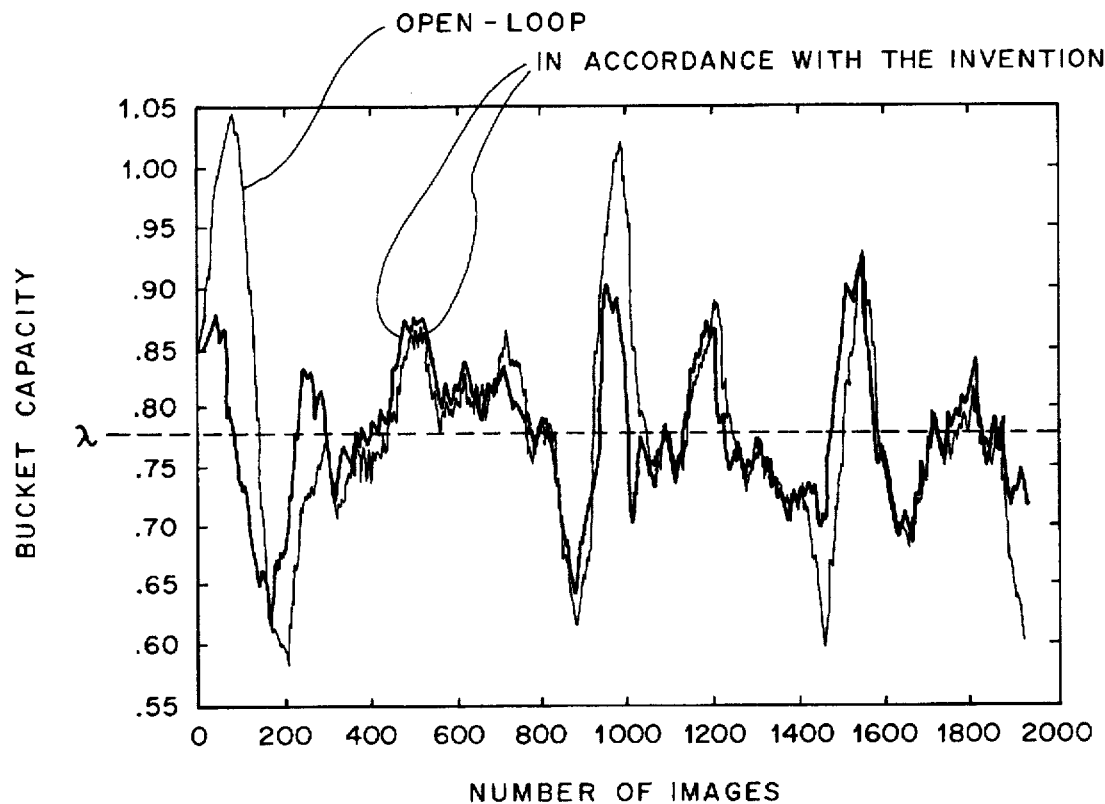
FIG. 5 is a graph showing the efficiency of the process of the invention.
Figure 6:
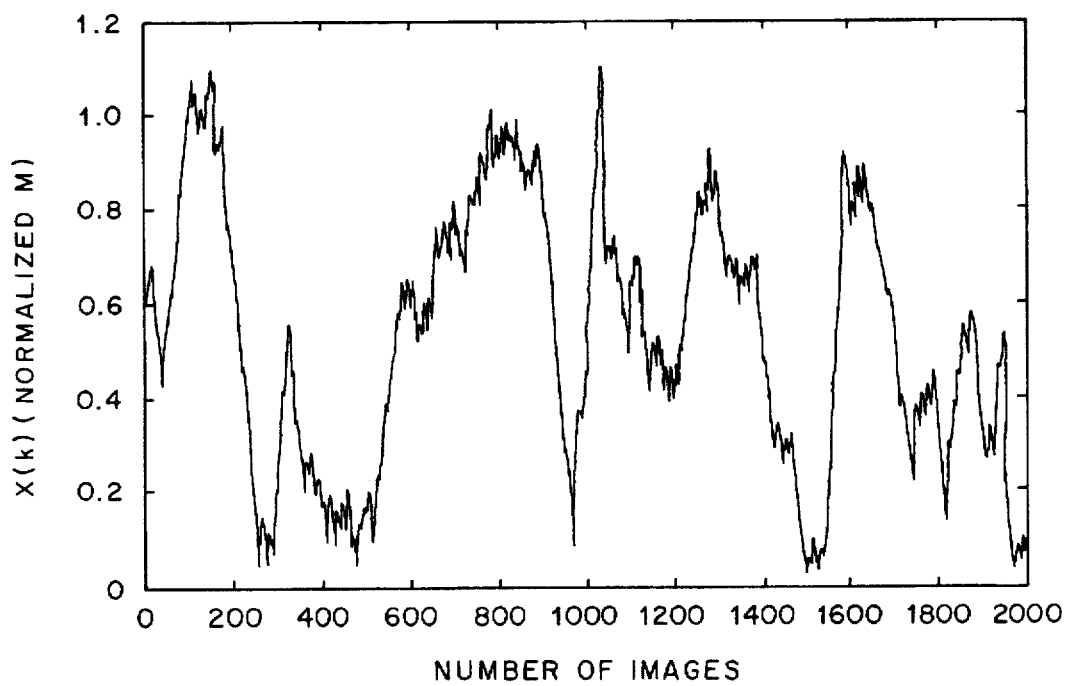
FIG. 6 is a graph showing the variation in the rate of filling of the leaky bucket in terms of the image numbers for a given sequence of images.

FIG. 5 shows the flow rates respectively generated by these two codings. It can be seen that the algorithm of the invention generates less traffic than the open-loop coding for the very active scenes (images 1 to 150 and 900 to 1000) and more traffic for the inactive scenes (see for example the images 200 to 300 and 1400 to 1500). The variability of the flow rate is therefore maintained and is proportional to the complexity of the scene. The variations in the rate of filling of the bucket X(i) are presented in FIG. 6. The dynamics of the filling of the bucket show that the algorithm of the present invention fully exploits the variability permitted in this sense where it empties the bucket during inactive scenes and fills it during active scenes, thus giving a better visual quality. This behaviour cannot be achieved by the algorithms of the prior art.

We claim:

1. A process for controlling a data output flow rate of a coder of digital data which is representative of a sequence of images, said coder including a quantization stage having a quantization parameter Q, said sequence of images comprising successive groups of images, said process comprising the steps of:

setting a quantization parameter Q(i+1) for coding an (i+1) group of images at a moment when data of an i group of images is at an output of the coder, said digital data having a flow rate at the output of said coder conforming to a version of a leaky bucket defined by a size M and by a leakage rate $\lambda$; and setting said quantization parameter Q(i+1) for the coding of the (i+1) group of images in terms of an activity of a scene represented by the i group of images, the scene of said i group of images being active when its open-loop flow rate is greater than the leakage rate $\lambda$ of the leaky bucket and being inactive when said open-loop flow rate is less than the leakage rate $\lambda$, said open-loop flow rate of a group of images being the flow rate which said scene of images would have at an output of said coder if it had been quantized with a constant quantization parameter Qo at an average rate D over an entire sequence of images to which said scene of images belongs is equal to the leakage rate of said leaky bucket, the average rate D being an average rate when each group of the images is quantized with a constant parameter.

2. The process according to claim 1, and further steps of setting the quantization parameter Q(i+1) wherein:

active scenes have a flow rate at the output of the coder which is equal to (a) the open-loop flow rate when a rate of filling the bucket is zero, (b) the leakage rate of said leaky bucket when the rate of filling the bucket is equal to a maximum rate for filling said bucket, and (c) a value between the open-loop flow rate and the leakage rate when the rate of filling said bucket takes a non-zero value which is lower than its maximum rate of filling; and, inactive scenes have a flow rate at the output of the coder which is equal to (d) the leakage rate of said leaky bucket when the rate of filling the bucket is zero, (e) the open-loop flow rate when the rate of filling of the bucket is equal to the maximum rate of filling of said bucket, and (f) a value included between the leakage rate and the open-loop flow rate when the rate of filling said bucket takes a non-zero value which is lower than its maximum rate of filling.

3. The process according to either claim 1 or 2 and further comprising the steps of setting the active scene quantization parameter by calculating, a function having (a) a variable rate of filling of the leaky bucket and (b) a parameter according to the leakage rate of said bucket (c) the maximum rate of filling said bucket, and (d) a predetermined quantization parameter; and setting the inactive scenes quantization parameter by using another function having variables and parameters which are the same.

4. The process according to either claim 1 or 2 further comprising the steps of setting a quantization parameter wherein:

(a) an active scene flow rate at the output of the coder is equal to a calculation of a continuously decreasing function f having a variable responsive to the rate of filling the leaky bucket which takes:

(i) a value equals to the open-loop flow rate as a zero value of the rate of filling of the bucket, (ii) a value equals to the leakage rate of said leaky bucket as a value of the rate of filling the bucket is equal to the maximum rate of filling said bucket, and (iii) a value included between the open-loop flow rate and the leakage rate as an intermediate value of the rate of filling; and (b) the inactive scenes flow rate at the output of the coder is equal to a calculation of a continuous decreasing function g having a variable responsive to the rate of filling the leaky bucket which takes:

(i) a value equals to the leakage rate of said leaky bucket as a zero value of the rate of filling, (ii) a value equals to the open-loop flow rate as a value of the rate of filling the bucket equal to the maximum rate of filling said bucket, and (iii) a value included between the leakage rate and the open-loop flow rate as an intermediate value of the rate of filling.

5. The process according to claim 4 wherein said calculation includes a determination of the quantization parameter by calculating of the following functions:

(a) for active scenes:

$$Q(i+1)=Qo \times Go(i)/f; \text{ and}$$

(b) for inactive scenes:

$$Q(i+1)=Qo \times Go(i)/g$$

where Go(i) is the open-loop flow rate, and said (i) is a group of images.

6. The process of claim 4 wherein said calculation further comprises a derivation of the function f as a value decreasing responsive to the rate of the filling of the bucket and the function g as a value decreasing responsive to the rate of the filling of the bucket.

7. The process of claim 5 wherein said calculation further comprises a derivation of the function f as a value which is decreasing responsive to the rate of filling the bucket and the function g is a value which is decreasing responsive to the rate of filling the bucket.

8. The process according to claim 6, wherein the function f is:

$$f=G_o(i).(1-\epsilon_1(x))+\lambda.\epsilon_1(x)); \text{ and}$$

the function g is:

$$g=\lambda.(1-\epsilon_2(x))+G_o(i).\epsilon_2(x))$$

wherein $\epsilon_1(x)$, and $\epsilon_2(x)$, are arbitrary functions, and x defines the filling of the bucket in terms of information relating to the number of bits present in the bucket and the size of the bucket.

9. The process according to claim 7, wherein the function f is:

$$f=G_o(i).(1-\epsilon_1(x))+\lambda.\epsilon_1(x)); \text{ and}$$

the function g is:

$$g=\lambda.(1-\epsilon_2(x))+G_o(i).\epsilon_2(x))$$

wherein $\epsilon_1(x)$, and $\epsilon_2(x)$, are arbitrary functions, and x defines the filling of the bucket in terms of information relating to the number of bits present in the bucket and the size of the bucket.

* * * * *